(12) United States Patent
Eichhorn

(10) Patent No.: US 6,471,382 B2
(45) Date of Patent: Oct. 29, 2002

(54) LIGHT GUIDING HEADLIGHT FOR A VEHICLE

(75) Inventor: Karsten Eichhorn, Ennigerloh (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/732,936

(22) Filed: Dec. 11, 2000

(65) Prior Publication Data

US 2001/0006466 A1 Jul. 5, 2001

(30) Foreign Application Priority Data

Dec. 11, 1999 (DE) .......................................... 199 59 910

(51) Int. Cl.$^7$ ................................................. F21V 9/00
(52) U.S. Cl. ........................ 362/511; 362/552; 362/554; 362/583
(58) Field of Search .............................. 362/511, 551, 362/552, 583, 554

(56) References Cited

U.S. PATENT DOCUMENTS 5,499,168 A * 3/1996 Cochard et al. ............ 362/466

FOREIGN PATENT DOCUMENTS

| DE | A-14209957 | 9/1993 |
| DE | A-14313914 | 11/1994 |
| DE | A-14313915 | 11/1994 |
| DE | A-11974031-6 | 3/1999 |
| EP | A-10678699 | 10/1995 |

* cited by examiner

Primary Examiner—Sandra O'Shea
Assistant Examiner—Ronald E. DelGizzi
(74) Attorney, Agent, or Firm—Birch, Stewart, Kolasch & Birch, LLP

(57) ABSTRACT

A lighting device for motor vehicles, having at least one light output element to produce a given light distribution, having at least one light source arranged at a distance from the light output element, having at least one optical fiber for connecting the light source to the light output element, where a plurality of light output elements are provided, and a light function selector is connected upstream for optional selection of the light output elements.

9 Claims, 3 Drawing Sheets

LIGHT GUIDING HEADLIGHT FOR A VEHICLE

BACKGROUND OF THE INVENTION

1. Field of the Invention

The present invention relates to a lighting device for motor vehicles having at least one light output element to produce a predetermined light distribution, having at least one light source arranged at a distance from the light output element, with at least one optical guide for connecting the light source to the light output element.

2. Related Art

European Patent document 678 699 B1 describes a lighting device for motor vehicles, having light output elements designed accordingly to produce a predetermined light distribution, e.g., a low beam function, a high beam function or a fog light function, these light output elements being arranged in the edge area of the outer shell of an automobile. The light output element is connected by an optical fiber to a light source arranged at a distance. One disadvantage of the known lighting device is that due to an unambiguous correlation of the light output element with the optical guide or the light source, the resulting light function is determined definitively.

German Patent Application 43 13 914 A1 describes a lighting device for motor vehicles, where several light output elements are provided to produce different light distributions. The light output elements are each connected optically by optical guides to a common light source or to the respective assigned light sources. To produce a predetermined light distribution, which may be independent of the ambient conditions of the vehicle, the known lighting device has individual light output elements connected or rendered ineffective by blanking them out. However, it is a disadvantage of the known lighting device that the total optical path between the light source and the light output element can no longer be utilized due to blanking out.

SUMMARY OF THE INVENTION

An object of the present invention is to improve upon a lighting device for motor vehicles such that producing the light functions can be made in a more flexible and simple manner.

This object and other objects of the present invention are achieved by providing a plurality of light output elements with an upstream light function selector for optional selection of the light output elements.

The special advantage of the lighting device according to this invention is that a light function selector is provided, permitting optical separation of a light output element from a light source arranged at a distance. For example, a light source can be connected to various and/or multiple light output elements. In addition, a light output element can be connected to multiple light sources at the same time or in succession, so that in the event of failure of a first light source, it can be replaced by a second light source to maintain the predefined light function.

In particular, according to the present invention, the light output elements are not controlled by turning the light sources on and off, but instead they are controlled by a light function selector, which allows switching the light signal of one or more light sources to a predefined light output element. This yields an increased flexibility in guiding light signals. In addition, the operating reliability of the lighting device can be improved through the present invention. Furthermore, the tolerance for the design of the lighting device, which is preferably in the form of a headlight, can be increased.

According to a preferred embodiment of the present invention, the light function selector is arranged in the area of a light input unit. Thus, the light signal is switched in an area near the light source. The light output element can be connected rigidly to an optical guide assigned to it. The space required in the outlet area (headlight area) of the light bundle can be reduced in this way.

Additionally, according to the preferred embodiment of the present invention, for each light source the light input unit has a light-deflecting element that is designed to be pivotable. The light-deflecting unit deflects light emitted by a light source in the direction of a given optical guide. This advantageously yields a simple design of the light input unit, which permits reliable light injection into the respective optical guide.

According to another embodiment of this invention, the light-deflecting unit is designed as a reflector which can be brought into at least two light input positions. The reflector advantageously permits a relatively high luminous flux, which can be input into the respective optical guide.

According to yet another embodiment of this invention, a light function is created by combining at least two light output elements, each generating a segmented basic light distribution. By adding standardized basic light distributions, it is advantageously possible to produce a plurality of light functions, e.g., a high beam function, a low beam function and a fog light function. Additional light functions can be generated easily through this "segmentation" of the light distribution as a function of ambient conditions. For example, additional light distributions can be created depending on the driving conditions, thereby generating an optimally coordinated light function. Therefore, the light functions can be adapted to ambient conditions automatically and continuously as a function of the amount of darkness in the environment by cross-fading the light distributions. In addition, it is also possible to automatically activate additional light functions in accordance with sensor signals. For example, when fog is detected, the fog light may be turned on automatically or the lights switched to low beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
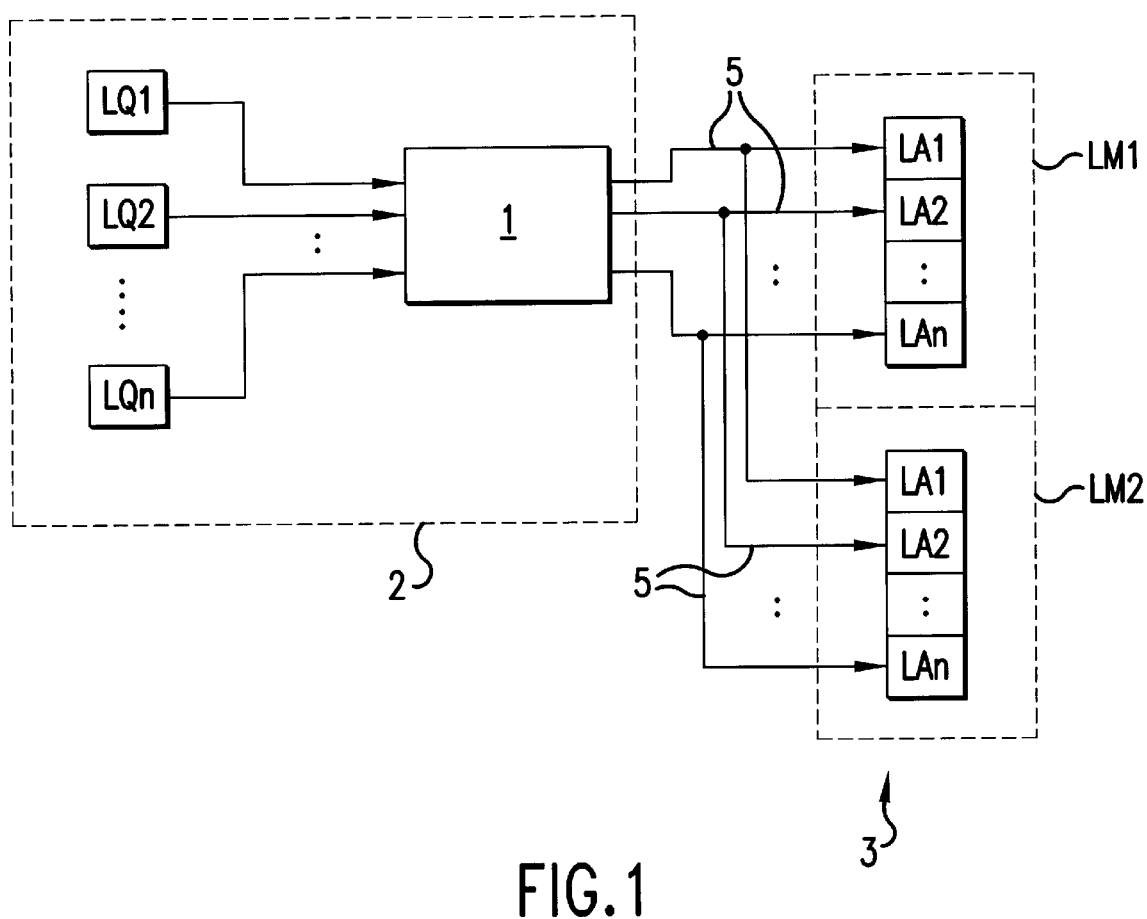
FIG. 1 illustrates a block diagram of a lighting device according to the present invention.

FIG. 1 illustrates a schematic diagram of a light function selector 1 for a lighting device 12 as part of a light input unit 2. The light input unit 2 is formed by the light function selector 1 and a plurality of light sources $LQ_1, LQ_2, \ldots LQ_n$, and is arranged at a distance from a light outlet area 3 that includes of a plurality of light output modules $LM_1, \ldots LM_n$. The light output modules $LM_1, \ldots LM_n$ are each assigned to a separate housing (not shown), preferably a headlight housing.

Each light module $LM_1, \ldots LM_n$ includes of a plurality of light output elements $LA_1, LA_2, \ldots LA_n$, which produce a basic light distribution 6a–6d (FIGS. 3–6) in conjunction with the respective correlated light output faces 4a–4d (FIG. 2) of optical guides 5, which are optically connected to the light function selector 1.

In a preferred embodiment according to FIG. 2 through 6, the light function selector 1 can be used to optionally drive different light output elements $LA_1, LA_2, LA_3, LA_4$, of a light output module $LM_1$, which is accommodated in a right front headlight housing of a motor vehicle and a light module $LM_2$ which is equipped with the same light output elements $LA_1, LA_2, LA_3, LA_4$ and is arranged in a left front headlight housing. Therefore, optical guides 5 run in pairs from the light function selector 1 to light modules $LM_1$ and $LM_2$.

Figure 2:
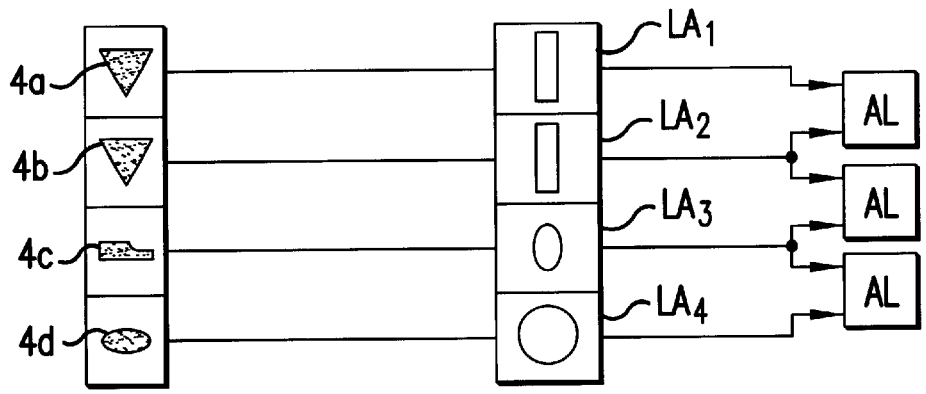
FIG. 2 illustrates a block diagram of different basic light functions, which are formed by the interaction of one end of an optical guide with the shape of a light output element.
Figure 3:
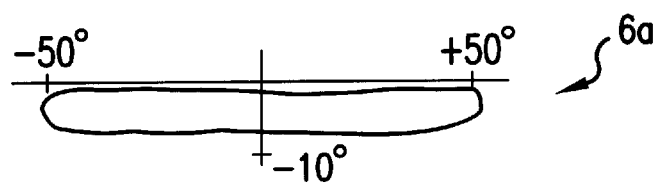
FIG. 3 illustrates a diagram of the basic light distribution according to a first embodiment.
Figure 4:
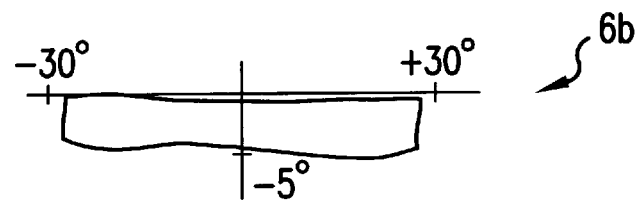
FIG. 4 illustrates a diagram of the basic light distribution according to a second embodiment.
Figure 5:
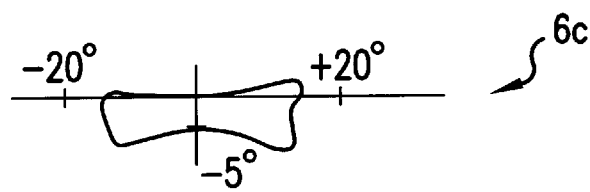
FIG. 5 illustrates a diagram of the basic light distribution according to a third embodiment.
Figure 6:
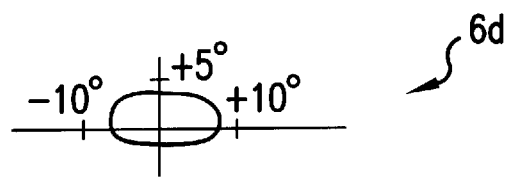
FIG. 6 illustrates a diagram of the basic light distribution according to a fourth embodiment.

As is illustrated in FIG. 2 in combination with FIGS. 3, 4, 5 and 6, four basic light distributions 6a, 6b, 6c and 6d are produced by optical linkage of a light outlet face 4a, 4b, 4c, 4d of an optical guide 5 (the cross section of light outlet faces 4a, 4b, 4c, 4d is shown in simplified form in FIG. 2) with the light output elements $LA_1, LA_2, LA_3, LA_4$. FIG. 2 illustrates the cross section or the top view of the light output elements $LA_1, LA_2, LA_3$, and $LA_4$. Thus, the first basic light distribution 6a, which is produced by controlling the first light output element $LA_1$, forms a broad light distribution with horizontal scattering below the light-dark limit. This basic light distribution 6a in combination with the second basic light distribution 6b, which is equivalent to a symmetrical low beam distribution, may preferably form a fog light NL. A low beam AL can be produced by joint selection of basic light distribution 6b with basic light distribution 6c, which corresponds more to a central low beam distribution with a 15° slope. A high beam FL can be produced by combining basic light distribution 6c with basic light distribution 6d, which produces a central light spot with areas above the light-dark limit.

To produce the light functions of a low beam AL, a fog light NL and a high beam FL, the light output elements $LA_1, LA_2, LA_3, LA_4$, of light output modules $LM_1, LM_2$ are each connected to the light function selector 1 by an optical guide 5.

To control the corresponding light output elements $LA_1, LA_2, LA_3, LA_4$, the light function selector 1 has a plurality of light deflecting elements 10 which are designed as reflectors assigned to each light source $LQ_1, LQ_2$ and can be aligned with the respective light input faces 14 of the optical guides 5 by pivoting about a relatively small angle with respect to a light input central plane of the respective optical guides 5. Each light source $LQ_1, LQ_2$ is provided with two optical guides 5, which branch off in the direction of light propagation to the respective light modules $LM_1, LM_2$. The light function selector 1 arranged between the light sources $LQ_1, LQ_2$ on the one hand and light output elements $LA_1, LA_2, LA_3, LA_4$ on the other hand thus makes it possible to control the same in order to form the predefined light functions AL, FL, NL in a manner that is both flexible and space saving due to the fact that it is arranged at a distance from light output elements $LA_1, LA_2, LA_3, LA_4$.

As illustrated in FIG. 2, the light output elements $LA_1, LA_2$ are arranged essentially in a rectangular pattern, while light output elements $LA_3, LA_4$ are designed to be elliptical or circular. The light outlet faces 4a and 4b are each triangular with a tip running upward; light outlet face 4c is essentially rectangular with a step, and light outlet face 4d is designed to be elliptical.

Light sources $LQ_1, LQ_2$ are arranged at a preferred location, preferably at a focal point of the reflectors with an elliptical design. Light sources $LQ_1, LQ_2, LQ_n$ are each designed as gas discharge lamps. The Optical guide 5 is preferably designed as a two-armed optical fiber made of hot-fused component optical fibers.

Figure 7:
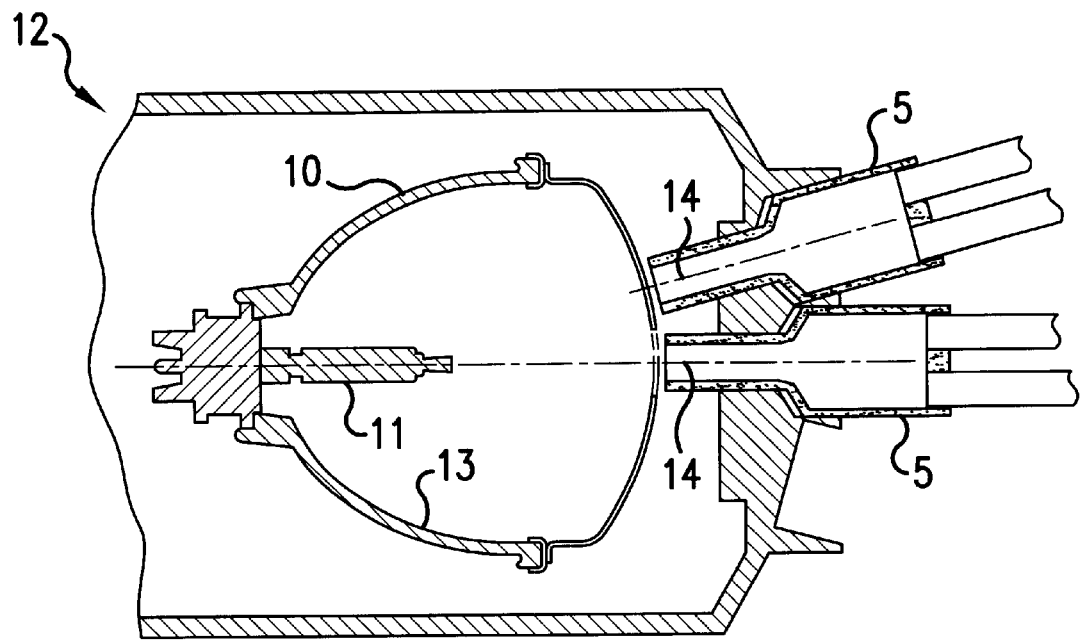
FIG. 7 illustrates a pivotable light-deflecting element.
Figure 8:
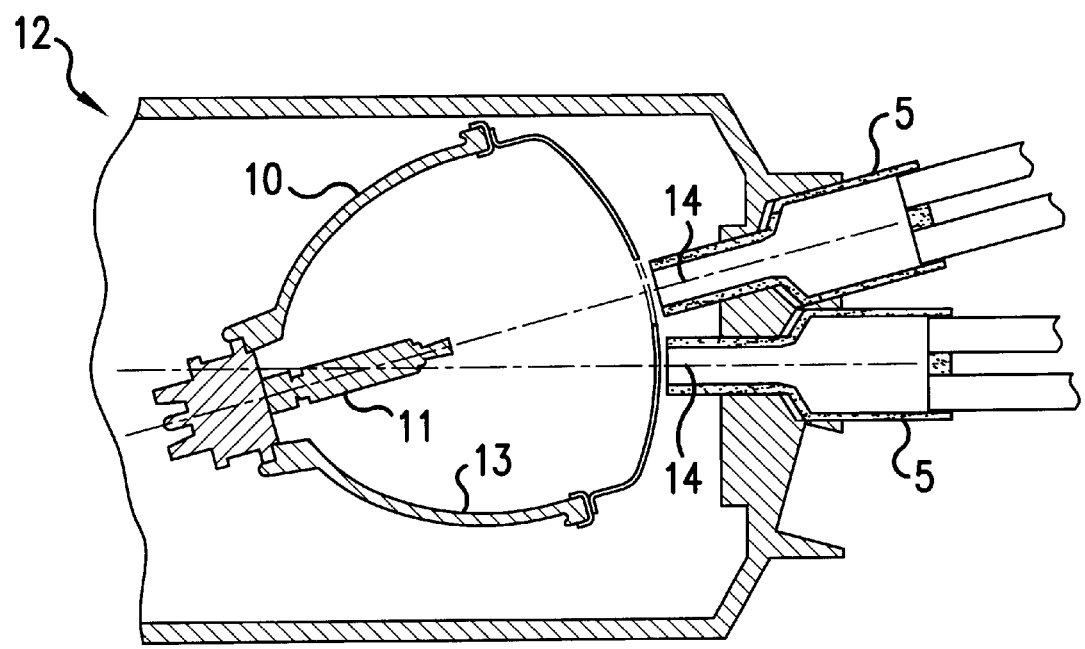
FIG. 8 illustrates a cross section of a pivotable light-deflecting element.

FIGS. 7 and 8 represent a cross section of a light device 12. There is shown the light-deflecting element 10, which has a reflector 13 encompassing a light source 11, representing any one of the light sources $LQ_1, LQ_2, LQ_n$. The light-deflecting element 10 is aligned with the respective light input faces 14 of the optical guides 5.

The invention being thus described, it will be obvious that the same may be varied in any ways. Such variations are not to be regarded as a departure from the spirit and scope of the invention, and all such modifications as would be obvious to one skilled in the art are intended to be included within the scope of the following claims.

What is claimed is:

1. A lighting device for a vehicle, comprising:
   at least one light output device for producing a light distribution and having a plurality of light output elements ($LA_1, LA_2, LA_3, LA_4, \ldots LA_n$);
   an upstream light function selector (1) for optional selection of the light output elements ($LA_1, LA_2, LA_3, LA_4, \ldots LA_n$), said upstream light function selector (1) operatively connected to said at least one light output element;
   at least one light source ($LQ_1, LQ_2, \ldots LQ_n$) arranged at a distance from the light output element; and
   at least one optical guide (5) for connecting the light source ($LQ_1, LQ_2, \ldots LQ_n$) to the light output device, wherein said light function selector (1) is disposed between said light source ($LQ_1, LQ_2, \ldots LQ_n$) and said optical guide, said light function selector (1) and said light source ($LQ_1, LQ_2, \ldots LQ_n$) combined being a light input unit (2) into which said optical guide interfaces to receive light emitted from said light source ($LQ_1, LQ_2, \ldots LQ_n$).

2. The lighting device according to claim 1, wherein the light input unit (2) has a light deflecting element (10) which is provided for said at least one light source ($LQ_1, LQ_2, \ldots LQ_n$) and is mounted to be pivotable.

3. The lighting device according to claim 2, wherein the light deflecting element is a reflector (13) which can be brought into at least two light input positions, in which said light source ($LQ_1$, $LQ_2$, ... $LQ_n$), mounted at a preferred point (focal point), is alignable with said at least one optical guide (5).

4. The lighting device according to claim 1, wherein at least two light output elements ($LA_1$, $LA_2$, $LA_3$, $LA_4$ ... $LN_4$), which produce a segmented basic light distribution (6a, 6b, 6c, 6d), are connected together to form a given light function (NL, AL, FL).

5. The lighting device according to claim 1, wherein the optical guide (5) has a light outlet face (4a, 4b, 4c, 4d), which is shaped so that it produces a basic light distribution (6a, 6b, 6c, 6d) in conjunction with one of the light output elements ($LA_1$, $LA_2$, $LA_3$, $LA_4$, ... $LA_n$).

6. The lighting device according to claim 5, wherein the number of said at least one optical guide (5), downstream from said light function selector (1) in the direction of propagation of light, corresponds to a number of light output elements ($LA_1$, $LA_2$, $LA_3$, $LA_4$, ... $LA_n$).

7. The lighting device according claim 4, wherein the light distributions (6a, 6b, 6c, 6d) are designed so that a light function (AL, FL, NL) can be produced by combining two light distributions (6a, 6b, 6c, 6d).

8. The lighting device according to claim 1, wherein said light source ($LQ_1$, $LQ_2$, ... $LQ_n$) is a gas discharge lamp.

9. The lighting device according to claim 1, wherein said optical guide (5) is a two-armed optical fiber (5) having two component optical fibers fused together.

* * * * *